(12) United States Patent
Marechal (10) Patent No.: US 6,195,177 B1
(45) Date of Patent: Feb. 27, 2001

(54) TELECOMMUNICATION NETWORK HAVING AT LEAST ONE FACSIMILE MACHINE, THE NETWORK HAVING AN IDENTIFICATION MEANS FOR IDENTIFYING AND VERIFYING AN IDENTITY OF A REGISTERED USER AND A CONTENT OF A FACSIMILE MESSAGE

(75) Inventor: Guy N. L. J. Marechal, Brussels (BE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/299,791

(22) Filed: Dec. 4, 1996

Related U.S. Application Data (63) Continuation of application No. 08/239,485, filed on May 9, 1994, now abandoned.

(30) Foreign Application Priority Data

May 10, 1993 (BE) .................................................. 09300478

(51) Int. Cl.[7] ...................................................... H04N 1/00
(52) U.S. Cl. .......................... 358/434; 358/402; 358/407; 358/440
(58) Field of Search ..................................... 358/402, 403, 358/407, 434, 435, 438, 439, 440; 380/18

(56) References Cited

U.S. PATENT DOCUMENTS

| 5,068,888 | * | 11/1991 | Scherk et al. ........................ 379/100 |
| 5,168,376 | * | 12/1992 | Motohama ............................ 358/437 |
| 5,283,665 | * | 2/1994 | Ogata .................................... 358/434 |
| 5,291,302 | * | 3/1994 | Gordon et al. ....................... 358/400 |
| 5,339,156 | * | 8/1994 | Ishii ...................................... 358/402 |
| 5,339,361 | * | 8/1994 | Schwalm et al. ...................... 380/18 |
| 5,491,563 | * | 2/1996 | Pomerantz ............................ 358/405 |

FOREIGN PATENT DOCUMENTS

| 0214609 | 3/1987 | (EP) . |
| 8803861 | 9/1991 | (FR) . |
| 9203000 | 2/1992 | (WO) . |

* cited by examiner

Primary Examiner—Thomas D. Lee (57) ABSTRACT

In known telecommunication networks users of a facsimile machine are not identified. As a result, no evidential value relating to the identity of the sending user or the identity of the receiving user and the originality of the contents of the facsimile message can be derived from messages sent by facsimile machines. A telecommunication network according to the invention comprises identification means for processing a user identification signal. The identification means are also arranged for producing a message encrypted according to a digital signature method, which message states that a facsimile message has been exchanged between a sending user and a receiving user. The message is produced in a machine-readable code. Since this message can only be generated by the identification means and the contents cannot be modified unnoticed later on, this is proof of an exchange of a facsimile message between the sending user and the receiving user.

25 Claims, 5 Drawing Sheets

| CENTIFAX USREQ | Your USID Reply |
|---|---|
| 121202 | 599999 |
| 132199 | 609911 |
| 133331 | 880832 |
| 141555 | 120001 |
| 147732 | 200338 |
| 148111 | 490255 |
| 150177 | 440475 |
| 150565 | 979797 |
| 157728 | 737060 |
| 158046 | 333162 |
| 159100 | 801389 |
| 161022 | 131535 |
| 162023 | 109020 |
| 166189 | 292944 |
| 173364 | 323033 |
| 178991 | 400209 |
| 188082 | 896219 |
| 189153 | 969664 |
| 192204 | 666666 |
| 196092 | 500000 |

| CENTIFAX USREQ | Your USID Reply |
|---|---|
| 196204 | 244211 |
| 198902 | 642743 |
| 200021 | 103966 |
| 204099 | 910185 |
| 250000 | 812134 |
| 262213 | 253573 |
| 271128 | 522594 |
| 281291 | 954120 |
| 321946 | 414490 |
| 344977 | 881777 |
| 364978 | 971733 |
| 365624 | 203709 |
| 382888 | 300441 |
| 464637 | 670021 |
| 470165 | 348142 |
| 499166 | 717455 |
| 585269 | 111523 |
| 673389 | 555400 |
| 795597 | 720333 |
| 899104 | 599908 |

FIG. 6

TELECOMMUNICATION NETWORK HAVING AT LEAST ONE FACSIMILE MACHINE, THE NETWORK HAVING AN IDENTIFICATION MEANS FOR IDENTIFYING AND VERIFYING AN IDENTITY OF A REGISTERED USER AND A CONTENT OF A FACSIMILE MESSAGE

This is a continuation of application Ser. No. 8/239,485, filed May 9, 1994 now abandoned.

BACKGROUND OF THE INVENTION

1. Field of the Invention

The invention relates to a telecommunication network comprising at least a facsimile machine.

2. Discussion of the Related Art

A facsimile machine to be used in such a telecommunication network is described in French Patent Application 8803861. This facsimile machine comprises a PROM memory whose contents cannot be changed by the user, in which the data of the facsimile machine as well as the number of the telephone line to be used for facsimile transmission are stored. When a facsimile is sent, these data plus day, time and information about the receiving facsimile machine are printed on the original message by the sending facsimile machine. All this information is sent along with the message to the receiving facsimile machine, so that it is also printed on the received facsimile.

As a result, both parties have information that a specific message has been exchanged between a sending facsimile machine and a receiving facsimile machine on a certain day and at a certain moment of time. A drawback of this method is that there is no identification of a user of the facsimile machine such as there is an identification of the receiver and the sender of a parcel in the case of registered post. As a result, no evidential value relating to the identity of the sender, the identity of the receiver and the originality of the contents of the facsimile message can be derived from messages sent by facsimile machine.

SUMMARY OF THE INVENTION

It is an object of the invention to provide a telecommunication network of the type defined in the opening paragraph, in which there is a possibility to have a user of a facsimile machine identified by an independent body.

A telecommunication network according to the invention is therefore characterized in that the telecommunication network comprises identification means for processing a user identification signal for the purpose of identifying a user of the facsimile machine. Such a user identification signal is personal and can therefore be entered only by the user. The identification means form part of the telecommunication network and are therefore managed by an independent body. The identifying of a user of the facsimile machine by an independent body provides a facsimile service that can be compared with registered post.

A network in which the user of a peripheral device is identified is known per se from Patent Specification EP 0 214 609. However, a user of a first terminal is then identified by a user of a second terminal. The users of such a telecommunication network all receive a secret personal key and a public key for the coding and decoding of messages. However, in such an instance, it is then necessary that each user is to have computer equipment.

An embodiment for a telecommunication network according to the invention is characterized in that the identification means are arranged for sending to a facsimile machine a message in a machine-readable code that an authenticated user identification code has been received. Examples of such a machine-readable code are the dot code, the mark code and the bar code.

A further embodiment for a telecommunication network according to the invention is characterized in that the identification means are arranged for sending to a facsimile machine a message in a machine-readable code that facsimile information has been received. In this manner the user has the disposal of information that proves the existence of a specific facsimile message.

A further embodiment for a telecommunication network according to the invention is characterized in that the identification means are arranged for sending to a facsimile machine a message in a machine-readable code which message comprises at least part of the contents of received facsimile information. As a result, the user has the disposal of a message that contains information about the contents of a specific facsimile message and supplied by an independent body.

A further embodiment for a telecommunication network according to the invention is characterized in that the message contains time information. As a result, the user has the disposal of information that proves that a certain happening took place at a specific moment of time.

A further embodiment for a telecommunication network according to the invention is characterized in that the message contains date information. As a result, the user has the disposal of information that proves that a certain happening took place at a certain date.

A further embodiment for a telecommunication network according to the invention is characterized in that the message contains address information of a user. In the preceding 6 embodiments of the invention the user always obtained a certain amount of proof of the sending or receiving of a message or of the happening of a certain event.

A further embodiment for a telecommunication network according to the invention is characterized in that the identification means are arranged for encrypting the message according to a digital signature method. The user receiving a message encrypted in a suchlike manner, can verify the identity of the body that has sent the message and the user can see whether the contents of the encrypted message are equal to the original contents. Since this message has been sent by the identification means managed by an independent body, the message may be used by the user as absolute proof of the sending or receiving of a message or of the happening of an event.

A further embodiment for a telecommunication network according to the invention is characterized in that the telecommunication network is arranged for letting the identification means send a user request signal to a facsimile machine, and for letting a facsimile machine send a user identification signal containing data authenticated by a user in response to the user request signal. By applying algorithms known per se which continue to generate different request signals for a specific user, the user is constantly to enter different user identifications coming from said algorithm. As a result, there is avoided that a third party, by looking over a user's shoulder when he/she enters his/her identification, or by tapping a telephone line, acquires the possibility of acting as the user of the facsimile machine at a later instant.

A further embodiment for a telecommunication network according to the invention is characterized in that the telecommunication network comprises at least a generator for generating the user identification signal in response to the user request signal entered in the generator. Such a generator is supplied to the user by the managing independent body. The generator generates a personal user identification signal belonging to the user.

A further embodiment for a telecommunication network according to the invention is characterized in that the identification means are arranged for coding the user request signal in response to the signal contents of the data signals received from the facsimile machine. These data signals may be, for example, the contents of a message to be sent by a user to another user via the identification means. If the user of the facsimile machine asserts at a later instant that the message had different contents from the real contents, the opposite may be proved by means of the contents of the user request signal. Naturally, this is only feasible if the user request signal has been stored in a specific form and if it is possible to have the identification means re-generate a user request signal intended for that very user, which user request signal is independent of the contents of the message about which the dispute has arisen.

A further embodiment for a telecommunication network according to the invention is characterized in that the identification means are arranged for supplying the user request signal in a machine-readable code and in that the identification means are arranged for processing the user identification signal if this is supplied to the identification means in a machine-readable code. This is advantageous in that the user can identify himself/herself by entering a user identification stated in a machine-readable code on a pre-printed form. This means that it is not necessary to equip existing facsimile machines with extra facilities.

A further embodiment for a telecommunication network according to the invention is characterized in that the digital signature method is carried out with a secret key method and a public key method. The authentication of a message sent by the identification means and encrypted with the secret key can be verified by means of the public key available to everybody. In that case only two keys are necessary.

A further embodiment for a telecommunication network according to the invention is characterized in that the identification means are arranged for sending one message containing the data authenticated by the digital signature method and the user request signal to the facsimile machine. This combines the user identification with proof of the sending or receiving of a facsimile message.

A further embodiment for a telecommunication network according to the invention is characterized in that the identification means comprise storage means for storing the signal contents of data signals received from the facsimile machine. These data signals may be, for example, the contents of a message a user sends to another user via the identification means. In the case of a dispute between users, the exact contents of the message can be called for.

BRIEF DESCRIPTION OF THE DRAWINGS

The invention will be further explained with reference to a drawing in which:

FIG. 2 shows the identification procedure according to an advantageous embodiment of the invention, FIG. 3 gives an example of a preprinted form which is completed by the sending user and sent to the identification means, FIG. 4 gives an example of a message encrypted with a secret key by the identification means and containing a user request signal.

DETAILED DESCRIPTION OF THE PREFERRED

Figure 1:
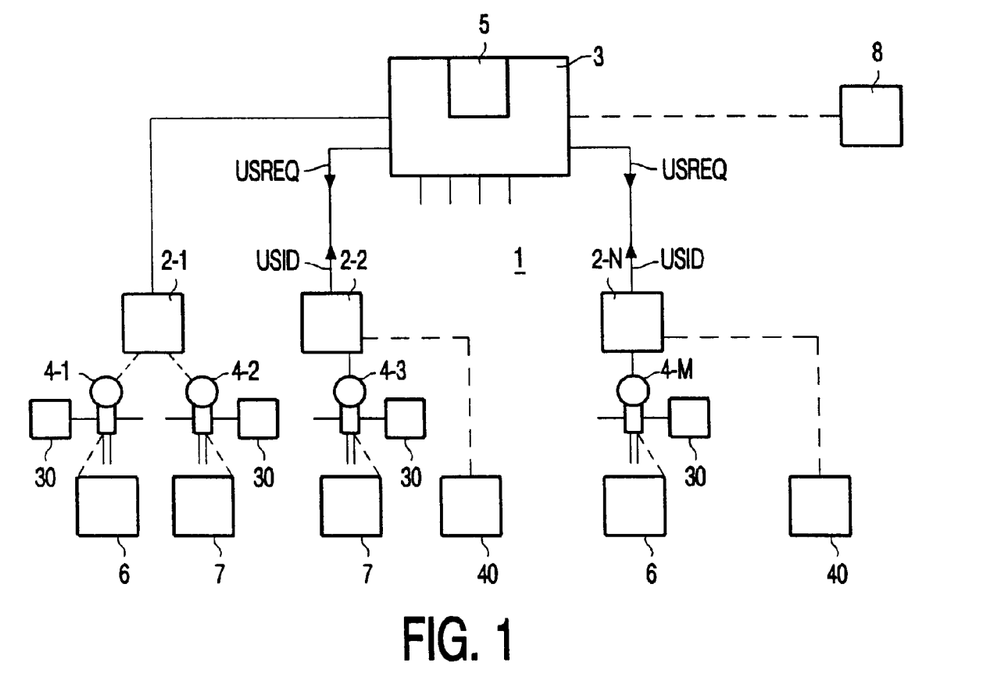
FIG. 1 shows a telecommunication network according to the invention.

FIG. 1 shows a telecommunication network 1 according to the invention. The telecommunication network 1 comprises a plurality of facsimile machines 2-1 . . . 2-N, and identification means 3 for identifying users 4-1 . . . 4-M of the facsimile machines 2-1 . . . 2-N. Users may be both persons, legal entities such as businesses, and devices working under the control of persons. The number of users M need not be equal to the number of facsimile machines N, because there may be a plurality of users 4-1 . . . 4-M per facsimile machine 2-1 . . . 2-N utilizing the telecommunication network 1 according to the invention. The network 1 according to the invention comprises the identification means 3 which make it possible to identify facsimile machine users. The identification means 3 are located in an exchange in the network or are accommodated in a decentralized manner at the users 4-1 . . . 4-M. The number of identification means 3 located in a telecommunication network 1 are not subject to limitation. The identification means 3 are to be installed by an independent body, preferably the network manager. This independent body registers all the system users 4-1 . . . 4-M who wish to make use of the facility for sending or receiving authenticated facsimiles. For this purpose, these users 4-1 . . . 4-M are to submit a request to the network manager. The network manager registers the personal data and the number of the facsimile machine 2-1 . . . 2-N, as required. The network manager sends to the user 4-1 . . . 4-M a personal generator 7 such as the Digipass generator produced by Digiline or a personal list (see FIG. 6) of associated codes of user request signals USREQ and user identification signals USID.

Figure 2:
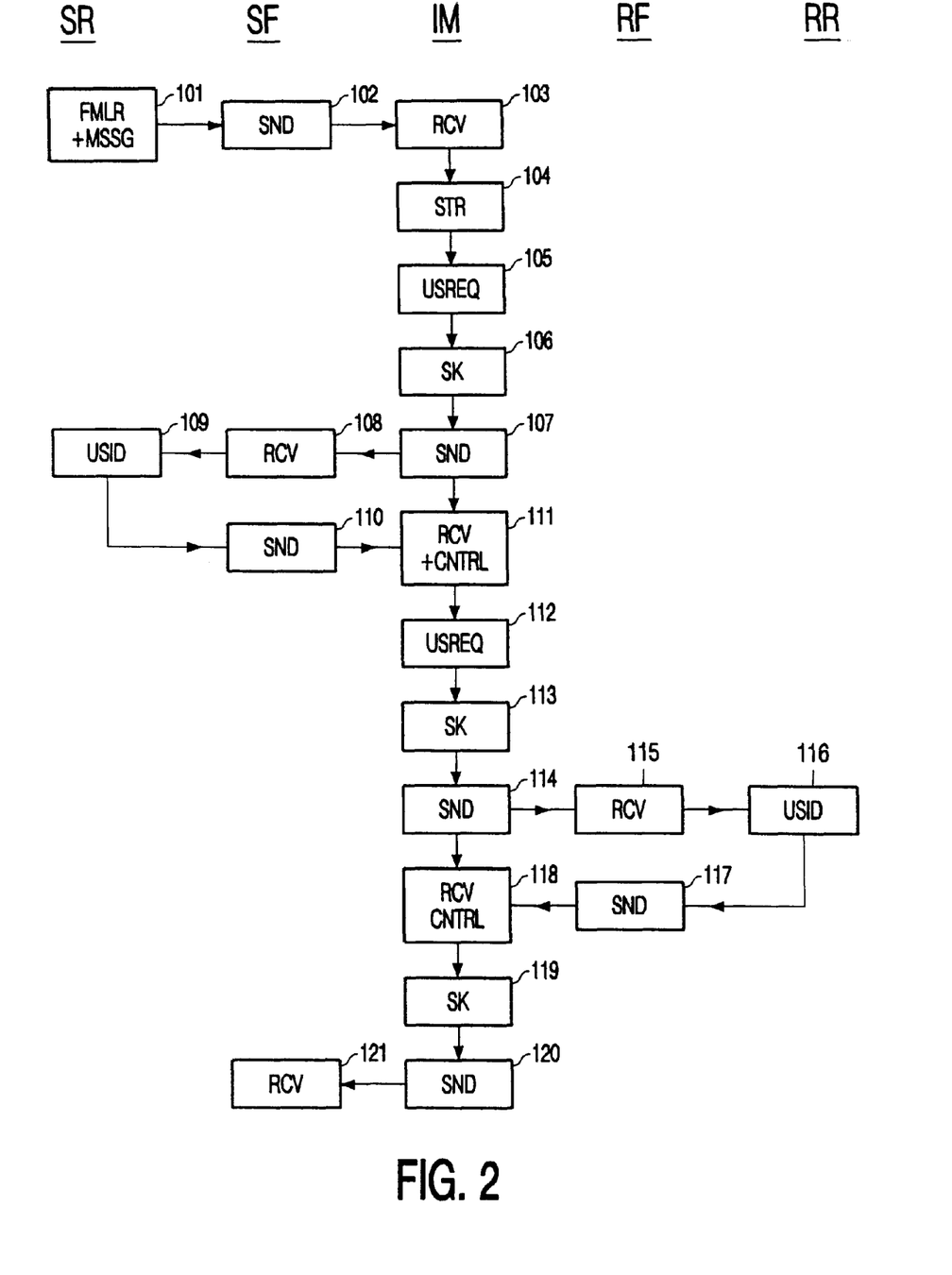

FIG. 2 shows the identification procedure according to an advantageous embodiment of the invention. This Figure shows the steps necessary to allow a sending user 4-3 belonging to facsimile machine 2-2 to send a registered message to a receiving user 4-M belonging to facsimile machine 2-N. The Figure is subdivided into 5 columns. Each column is headed by the person or machine carrying out the step involved. For example, SR denotes sending user, SF sending facsimile machine, IM stands for identification means, RF stands for receiving facsimile machine and RR stands for receiving user. In step 101 the sending user 4-3 completes a preprinted form 30.

Figure 3:
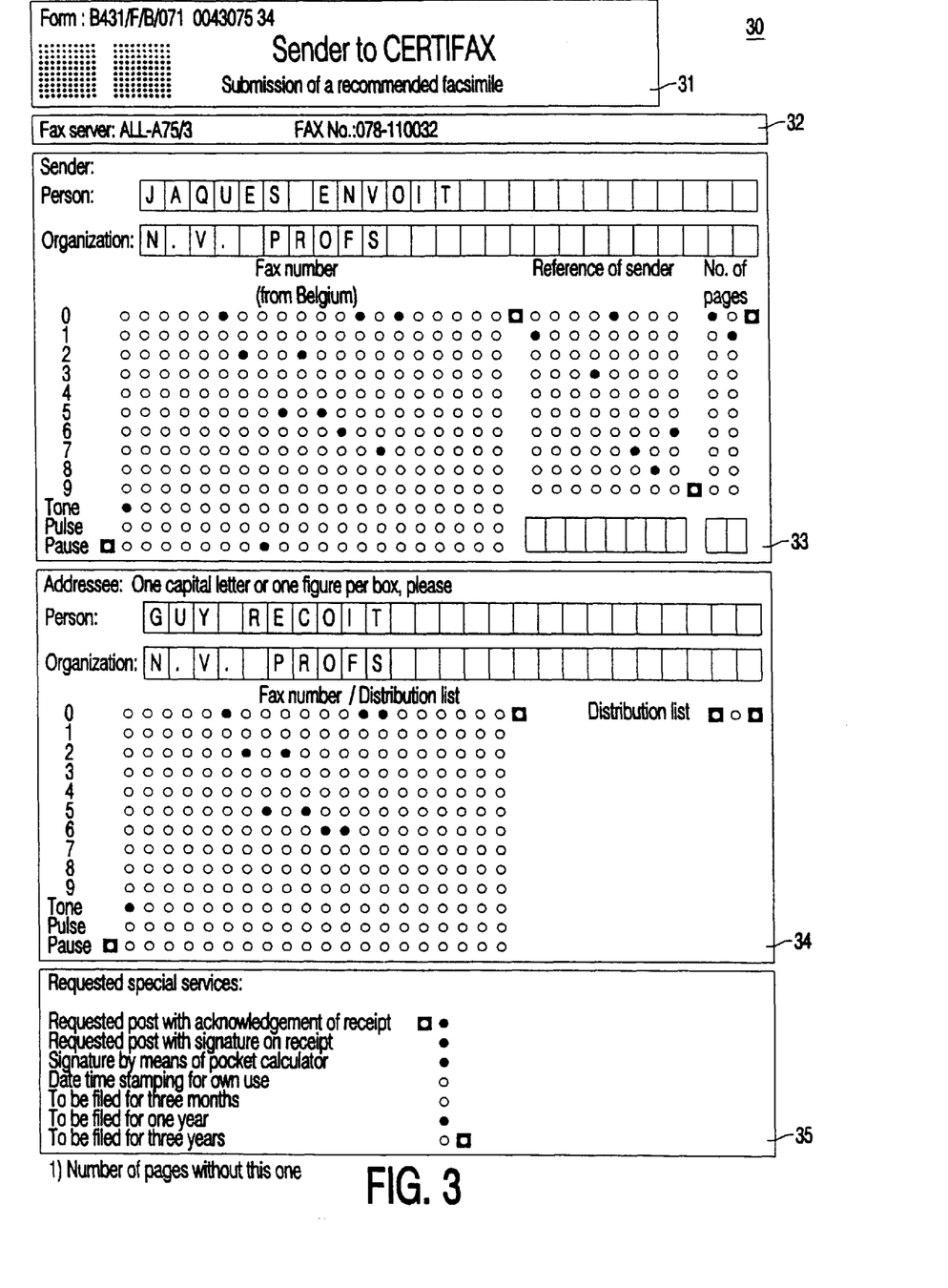

FIG. 3 shows an example of the preprinted form 30 on which the sending user 4-3 fills in in mark code the data of the receiving user 4-M to whom the message is to be sent and what services are to be used. Such a preprinted form 30 is sent to the users 4-1 . . . 4-M of the system by the independent body managing the identification means 3. The form 30 has a certain layout because it is to be read out automatically by the identification means 3. Box 31 states the data of the independent body and information about the type of form 30. Box 32 states the facsimile number of the identification means 3 and the number of the public key PK. Box 33 states in a preprinted layout the name of the sending user 4-3 in ordinary text and his/her facsimile number in mark code. Box 34 contains a preprinted layout for filling in the name of the receiving user 4-M and a preprinted part for filling in the facsimile number of the receiving user 4-M in mark code. Box 35 specifies a plurality of services. If the sending user 4-3 wishes to employ one of the services, he/she is to tick off a box behind this service. Examples of such services are:

The sending user 4-3 obtains an acknowledgement of receipt (Envoi recommande avec accuse de reception).

The contents of the message are stored by the identification means 3 for a certain period of time (Archivage durant trois mois), and so on.

The telecommunication network may also have the option to indicate by means of speech, in lieu of the form 30, to whom the registered facsimile message is to be sent and what services are desirably employed. In that case the identification means 3 are to be arranged for speech recognition. As an alternative to speech, the DTMF keys on the facsimile machine can be used to indicate this. After the data of the sending user 4-3, the data of the receiving user 4-M and the services requested from the identification means 3 by the sending user 4-3 have been filled in, this form 30 along with the message to be sent is sent to identification means 3 by the sending facsimile machine 2-2 in step 102 (SND=send). These identification means 3 receive the data in step 103 (RCV=receive), store the contents of the registered message in step 104 (STR=store) and generate a user request signal USREQ for the sending user 4-3 in step 105 (USREQ=user request). In the embodiment described here the user request signal (USREQ) is a 6-digit number. In step 106 (SK=secret key) a number of data relating to the sending user 4-3, the receiving user 4-M and the date and time as required, are encrypted with a secret key SK only known to identification means 3. In step 107 (SND) the data encrypted in step 106 are sent in directly readable form and in encrypted form to the sending facsimile machine 2-2 along with the user request signal USREQ. This signal is received in step 108 (RCV) and printed by facsimile machine 2-2.

Figure 4:
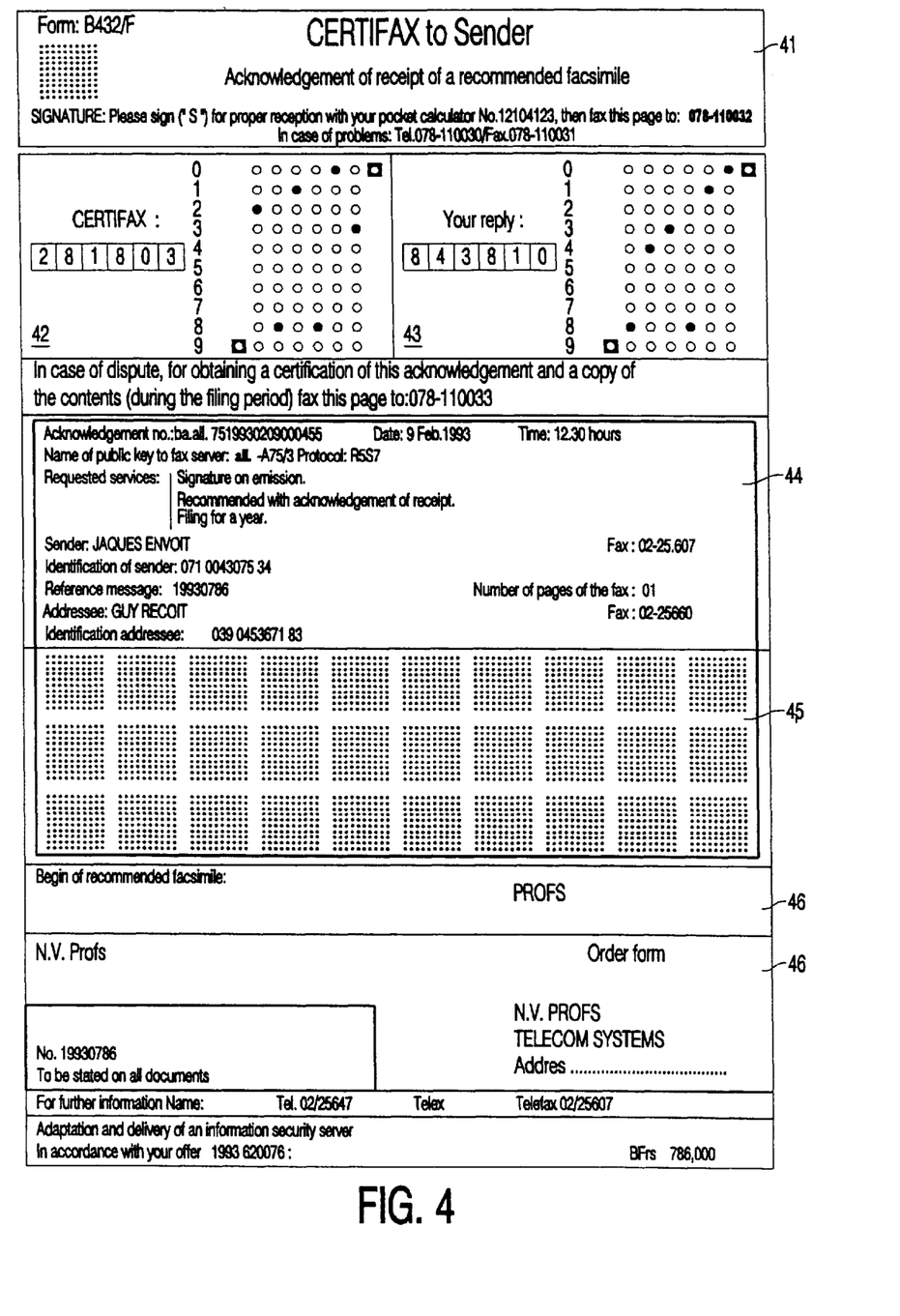

FIG. 4 gives an example of a message 40 sent by the identification means 3 to the facsimile machine 2-2 of the sending user 4-3 or, as will be explained hereinafter, to the facsimile machine 2-N of the receiving user 4-M, which message contains the details of both sending user 4-3 and receiving user 4-M, date and time in ordinary text and in code, and shows the user request signal USREQ in this basic example by way of a number (281803). Since this message 40 is also used for facsimileing back the user identification signal USID, this message has a predetermined layout. Box 41 shows the information about the independent body and information about the type of message 40. Box 42 mentions the user request USREQ both in ordinary digits and in mark code. Box 43 is a preprinted box for filling in the user identification USID both in ordinary digits and in mark code. Box 44 contains the information of the sending user 4-3, the information of the receiving user 4-M, the services requested, the date and moment of time in ordinary text. The number of the public key PK of the identification means 3 is also mentioned here. Box 45 contains the information of box 44 with the secret key SK of the identification means 3 in coded form. In this embodiment this information is dot-coded. This code contains redundant information. As a result, the information is still decodable even if a small number of dots are misplaced. In the event of a dispute, this information can be decoded with the public key PK. This makes it possible to verify whether the message 40 has been sent by the identification means 3 and whether nothing has changed in the original contents of the message. In box 46 part of the contents of the registered message is printed. Consequently, a specific amount of reliability about the contents is already built in. Absolute certainty can be obtained if the contents of the registered message are stored by the identification means 3. As will be further described with reference to the embodiment shown in FIG. 2, the identification means 3 will send a message similar to message 40, but not including a user request signal USREQ, to the facsimile machine 2-2 of the sending user 4-3 as an acknowledgement of receipt.

The sending user 4-3, having a personal generator 7 in his/her possession which he/she had previously received from the independent body managing the identification means 3, enters the 6-digit user request USREQ in generator 7 which generates the 6-digit user identification signal USID belonging to the sending user 4-3. If the user has no generator 7, he/she fills in a digit code based on the personal list 6. This USID is filled in in mark code in step 109 (USID=user identification) in response to the message 40 sent in step 108 (RCV). This message 40 can be used by the sending user 4-3 as proof of a registered message, because it may show by means of a deciphering of the encrypted message with the public key PK that message 40 has been sent by the identification means 3. In step 110 (SND) the message 40 now carrying the user identification USID of the sending user 4-3 is sent to the identification means 3 by the sending facsimile machine 2-2. In step 111 (RCV; CNTRL=control) these identification means 3 verify the identity of the sending user 4-3 on the basis of the sent user identification signal (USID).

Subsequently, in step 112 (USREQ) the identification means 3 determine a user request signal USREQ for the receiving user 4-M. This may be a 6-digit number specific of the receiving user 4-M corresponding to the user request signal USREQ of the sending user 4-3. In step 113 (SK) a number of data relating to the identity of the sending user 4-3, the identity of the receiving user 4-M and the date and moment of time, as required, are encrypted with the secret key SK by the identification means 3. In step 114 (SND) the data encrypted in step 113 (SK) are sent both in directly readable form and in encrypted form to the receiving facsimile machine 2-N along with the user request signal USREQ and the facsimile message stored in step 104. In step 115 (RCV) user 4-M receives this signal. In step 116 (USID) the receiving user 4-M determines the user identification USID in response to the received user request signal USREQ. This user identification is again a 6-digit number in this embodiment. This number is determined (since user 4-M has no generator 7) with the aid of a personal list 6 issued upon registration to the receiving user 4-M by the independent body, which list states what user identification USID is to be given as a response to a certain user request signal USREQ. This user identification USID is to be filled in in mark code in message 40 sent in step 116 (USID). This message 40 has an identical layout to the message 40 sent in step 107 to the sending user 4-3, but may have slightly different contents. The message may be used by the receiving user 4-M as proof that the sending user 4-3 has sent a registered message to him/her on a specific day and at a specific moment of time. In step 117 (SND) the message 40 is sent to the identification means 3 by the receiving facsimile machine 2-N. These identification means 3 verify in step 118 (RCV; CNTRL) the identity of the receiving user 4-M. If the identification means 3 have not received within a certain period of time the message 40 containing the user identification USID of the receiving user 4-M, a new request for the sending of the user identification signal USID is made to the receiving facsimile machine 2-N. If this request is not responded to within a certain period of time, the facsimile message is sent to the receiving user 4-M by registered post. Preferably, the cost of this is to be incurred by the receiving user 4-M. If the sending user 4-3 has requested by means of form 30 to be informed of the reception of the registered message by the receiving user 4-M, the identification means 3 code a suchlike message with the secret key SK in step 119 (SK). In step 120 (SND) this message is sent to the sending facsimile machine 2-2 which receives this message in step 121 (RCV). This procedure is used for acknowledgement of receipt of the message by the receiving user 4-M to the sending user 4-3.

For a person skilled in the art it is obvious that the invention is not restricted to the protocol represented in FIG. 2, but may easily be extended or modified. By analogy with the registered post, for which the sender is not always identified but only if the sender wishes to have an acknowledgement of receipt the identification of the sending user 4-3 may be dispensed with, for example. As a result, the steps 105 and 109 to 111 incl. in FIG. 2 are not carried out.

Each user 4-1 . . . 4-M may be supplied, as desired, with a personal generator 7 generating the user identification signal USID in lieu of the personal list 6 with coherent code numbers. The user request USREQ and the user identification USID naturally need not be numbers but may contain any arbitrary sign such as pure text. Other identification methods too can be easily incorporated in the invention. For example, it is possible, to supply the sending user 4-3 with a dynamic password generator which generates user-specific passwords (USID's) in response to time, which passwords are filled in directly on form 30 by the sending user 4-3 in step 101 (FMLR; MSSG). In that case the identification means 3 need not generate a user request signal USREQ when the sending user 4-3 wishes to send, and may directly change to verifying the identity by means of a received USID signal. Consequently, steps 105 to 111 incl. in FIG. 2 are omitted. The reliability of the system, however, becomes slightly degraded.

The sending user 4-3 may request on form 30 completed in step 101 (FMLR; MSSG) the identification means 3 to store the contents of the registered message for a rather long period of time (for example one year) in the storage means 5 shown in FIG. 1. As a result, it is possible to ask the managing independent body for the complete contents and verify the contents in the case of a dispute between the sending user 4-3 and the receiving user 4-M.

If the sending user 4-3 wishes to send a registered message to somebody who does not have a facsimile machine 2-1 . . . 2-N, or is not an authorized user of the system, the registered message can be sent to a facsimile machine 8 belonging to an authority delivering the post, after the registered message has been sent to the identification means 3 and the sending user 4-3 has been identified. The authority delivering the post takes care of the delivery of the registered message and the identification of the receiving person according to the procedure customary with registered post. This authority informs, after completion, the identification means 3 that the registered message has been delivered to the receiving person who has identified himself as such. If the sending user 4-3 has so requested, the identification means 3 can send an acknowledgement of receipt to the sending facsimile machine 2-2 in the manner described with respect to FIG. 2. The description given here also clarifies that somebody who does not have a facsimile machine 2-1 . . . 2-N can send a registered message to the receiving user 4-M of the system according to the invention via a post delivery service. After the sending person has identified himself at the office of the post delivery service, the message is sent to the identification means 3 which identify the receiving user 4-M in the manner described with respect to FIG. 2 and deliver the registered message.

Alternatively, it is possible to equip a data bank with the identification means 3 according to the invention. This enables a user 4-1 . . . 4-M of a facsimile machine 2-1 . . . 2-N to send registered facsimiles and obtain in above manner proof of the sending of this message. It is likewise possible to request in above manner personal data from a data bank per facsimile, which data are directly sent to the user 4-2 after step 111 (RCV; CNTRL) in FIG. 2 by the identification means 3. The further steps of FIG. 2 are then omitted.

Figure 5:
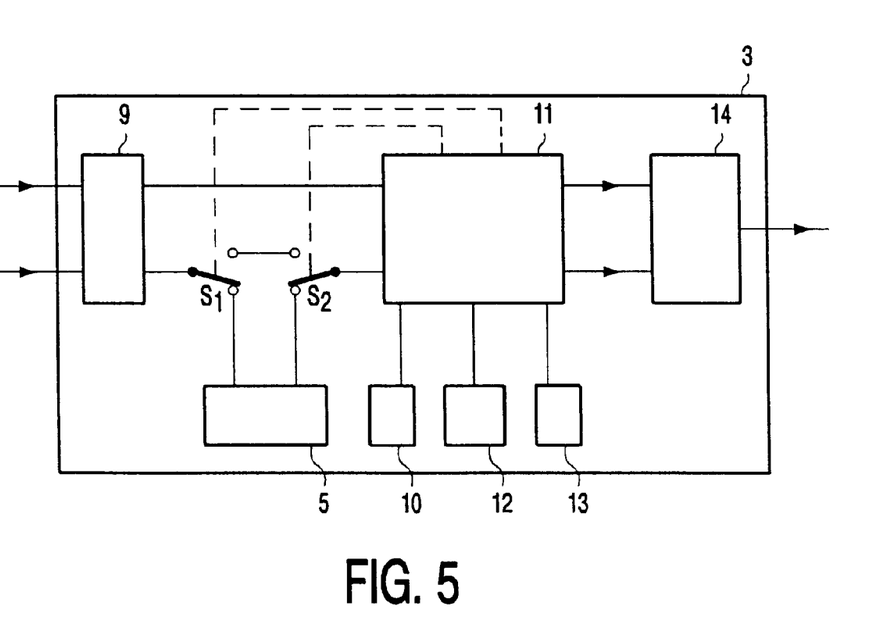
FIG. 5 shows a further embodiment for the identification means shown in FIG. 1.

FIG. 5 shows another embodiment for the identification means 3. These identification means 3 comprise a memory 5, an electronic reading system 9, a microprocessor 11 with a RAM 10 and a ROM 13, a clock generator 12 and a signal converter 14. The electronic reading system 9 sends address signals derived from the personal data to the microprocessor 11 which stores these signals in the RAM memory 10. The message to be sent can be stored in memory 5. The microprocessor 11 thereto sets a switch $S_1$ in the position shown. For determining the USREQ signal, the microprocessor reads the address signals from the ROM memory 10, a time and date signal from the clock generator 12, as required, and generates the user request signal USREQ on the basis of the first algorithm stored in ROM memory 13. This algorithm can be the algorithm used in the Digipass® products of Digiline. This USREQ signal is converted in the signal converter 14 to facsimile signals and sent to the sending user 4-3. Such a signal converter 14 may be, for example, the Intel SatisFAXtion® Modem/200 by Intel, which contains Intel SatisFAXtion® software. In addition, the microprocessor 11 computes the USID signal and stores this signal in RAM memory 10. Accordingly, the microprocessor 11 generates and sends out a USREQ signal for the receiving user 4-M.

The USID signals coming from users 4-1 . . . 4-M are applied to the microprocessor 11 by the electronic reading system 9. This processor will verify the identity of the users 4-1 . . . 4-M in response to the received USID signal and the USID signal stored in the ROM memory 10.

If information about the received message is necessary to generate the USREQ signal, the microprocessor 11 may directly access a received message by setting switches S1 and S2 in the position not shown. Alternatively, it is possible to read this message from memory 5 by setting switch S2 in the position shown if the message was stored there. For the purpose of verification, the message can be similarly read from memory 5 and sent to a user. The encrypting of a message with the secret key SK is carried out in the microprocessor based on a second algorithm stored in the ROM, for example, the RSA or DSA algorithm known per se for cryptographic purposes. Finally, this message is sent out via the signal converter 14.

Figure 6:
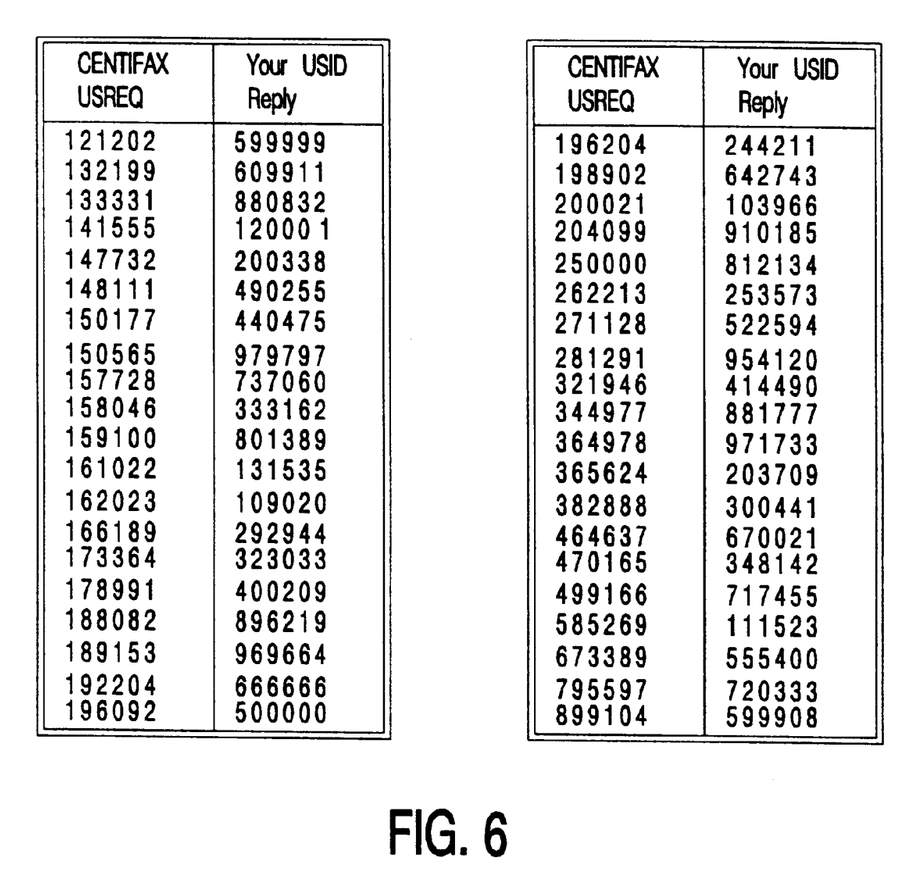
FIG. 6 shows a personal list for user identification signals.

FIG. 6 shows the personal list of an authorized user of the system. The drawing Figure shows USREQ signals in the left column and the associated USID signals in the right column.

What is claimed is:

1. A system for remote production of document on a printable surface comprising:
   a) a telecommunication network comprising:
      a registration means of facts to be certified to a remote party,
      an issuing party for controlling the generation of electronic data representing the certification of at least one fact, a communication means for transmitting the electronic data to at least one facsimile device of at least one addressee, a certificate to be used while verifying the integrity and authenticity of a printed representation on the surface of the certification of the at least one fact; and b) at least one facsimile device being arranged for receiving the electronic data and for printing the received electronic data on the surface;

wherein the printed information on the surface includes a machine readable representation of the certification of the at least one fact, of the identification of the issuing party and of information suitable for verification of the integrity and authenticity of said certification of the at least one fact and of said identity of the issuing party, using said certificate.

2. A system according to claim 1, including means for generating electronic document data to be supplied to the issuing party by an information sending party and for transmitting the electronic document data to the issuing party; and means for registering at least part of the received electronic document data as a fact.

3. A system according to claim 2, where, the system further comprises means under control of the issuing party of the information sending party, for transmitting at least a part of the electronic data generated by the information sending party to a receiving party.

4. A system according to claim 3, including means for the receiving party or for the information sending party to express, through the telecommunication network, to the issuing party that the information received by the receiving party is sufficiently equivalent to at least a selected part of the information transmitted by the information sending party or by the transmitting party to the issuing party.

5. A system according to claims 1, including identification and authentication means arranged for guaranteeing to the issuing party and the addressee, that at least one of the transmitting party, receiving party, and the sending party is identified and that an identity of the respective addressee, transmitting or receiving party, or sending party is authenticated.

6. A system according to claim 1, including electronic verification means for verifying the integrity and authenticity of said certification of said at least one fact and of said identity of the issuing party, using said certificate for decoding said representation on the surface or decoding a sufficiently accurate reproduction of said representation.

7. The system as claimed in claim 1, wherein the facts on said printed surface are in a robust machine readable code.

8. The system as claimed in claim 1, including verification means for the issuing party to verify the authenticity of the certified information from the printed surface or from a sufficiently accurate reproduction thereof.

9. The system of claim 1, further comprising verification means for any person to verify the authenticity of the certified information from the said printed surface or from its sufficiently accurate reproduction.

10. The system as claimed in claim 1, wherein the certified information on the printed surface includes that the identity of a user has been authenticated by the issuing party.

11. The system as claimed in claim 1, wherein the certified information on the printed surface includes that the identity of one or several persons involved in a transaction has been authenticated by the issuing party.

12. The system of claim 1, wherein the certified information on the printed surface includes the moment at which an event has happened.

13. The system of claim 1, wherein the certified information on the printed surface includes the place where an event has happened.

14. The system of claim 1, wherein the certified information on the printed surface includes the format of an electronic document and/or the format of another representation type on a surface.

15. The system of claim 1, wherein the certified information on the printed surface includes the certificate of identity of a user or of an issuing party.

16. The system of claim 1, wherein the certified information on the printed surface includes the statement that the fax has been received by the issuing party.

17. The system of claim 1, wherein the certified information on the printed surface includes the statement that the fax has been sent by the issuing party.

18. The system as claimed in claim 1, wherein the issuing party is certified by an independent body.

19. A system for transmitting certified information from a transmitting party to a receiving party so as to produce document on a printable surface at the side of the receiving party comprising:

a) a telecommunication network comprising:

a registration means of facts to be certified to a remote party, an issuing party for controlling the generation of electronic data representing the certification of at least one fact, a communication means for transmitting the electronic data to a facsimile device of the receiving party, a certificate to be used while verifying the integrity and authenticity of a printed representation on the surface of the certification of the at least one fact; and b) at least one facsimile device being arranged for receiving the electronic data and for printing the received electronic data on the surface;

wherein the printed information on the surface includes a machine readable representation of the certification of the at least one fact, of the identification of the issuing party and of information suitable for verification of the integrity and authenticity of said certification of the at least one fact and of said identity of the issuing party, using said certificate; and c) means for generating electronic document data to be supplied to the issuing party by the information sending party and for transmitting the electronic document data to the issuing party and means for registering at least part of the received electronic document data as a fact.

20. A system according to claim 19, wherein the issuing party controls generation of further electronic data representing a further certification of at least one fact, the further electronic data are transmitted to a facsimile device of the sending party, a certificate is used while verifying the integrity and authenticity of a printed representation on the surface of the further certification of the at least one fact at the side of the sending party; and the facsimile device of the sending party receives the further electronic data and prints the received further electronic data on the surface;

wherein the printed information on the surface at the side of the sending party includes a further machine readable representation of the certification of the at least one fact, of the identification of the issuing party and information suitable for verification of the integrity and authenticity of said certification of said at least one fact and of said identity of the issuing party, using said certificate.

21. A system according to claim 19, including identification and authentication means arranged for guaranteeing to the issuing party and the addressee, that at least one of the transmitting party, receiving party, and the sending party is identified and that an identity of the respective addressee, transmitting or receiving party, or sending party is authenticated.

22. A system according to claim 19, including electronic verification means for verifying the integrity and authenticity of said certification of said at least one fact and of said identity of the issuing party, using said certificate for decoding said representation on the surface or decoding a sufficiently accurate reproduction of said representation.

23. A system according to claim 19, in including means for the receiving party or for the information sending party to express, through the telecommunication network, to the issuing party that the information received by the receiving party is sufficiently equivalent to at least a selected part of the information transmitted by the information sending party or by the transmitting party to the issuing party.

24. A system for remote production of document on a printed surface, said system comprising:

a telecommunication network including certification means for certifying information to a sending party;

means for controlling the generation of electronic data representing the certified information; means for transmitting the electronic data to an output device of a sending party, said electronic data including a certificate for verifying the integrity and authenticity of said certified information; and an output device for receiving and printing the electronic data on said printed surface;

wherein the printed surface includes a machine readable representation of the certified information, the identification of the telecommunication network, and means for verifying the integrity and authenticity of the certified information and the identification of the telecommunication network.

25. The system as claimed in claim 24, wherein the system includes means for generating and transmitting electronic data to said telecommunication network and said certification means certifies said electronic data as certified information.

* * * * *